Patented June 6, 1950

2,510,882

UNITED STATES PATENT OFFICE 2,510,882

STABLE DISPERSION OF PHENYL BETA NAPHTHYLAMINE AND THE LIKE

Albert P. Giraitis, Bradford, Pa., and Kenneth J. Whittet, East Northport, N. Y., assignors to Standard Oil Development Company, a corporation of Delaware No Drawing. Application April 26, 1947, Serial No. 744,156

5 Claims. (Cl. 260—17.4)

This invention relates to the production of synthetic rubbery materials by an emulsion polymerization process and more particularly relates to the dispersion and introduction of an organic stabilizing agent into the emulsion or latex after the main reaction is substantially complete and before the emulsion or latex is coagulated.

Emulsion processes for producing rubbery material by polymerizing a diolefin such as butadiene with styrene or acrylonitrile are known. In these processes it is desirable to add anti-oxidants or stabilizers such as phenylbetanaphthylamine to the polymerizates. However, it has been found that organic stabilizers such as phenylbetanaphthylamine are not readily dispersed in the emulsion and do not stay dispersed therein.

According to our invention phenylbetanaphthylamine is ball milled with bentonite clay and gum arabic to make a stable dispersion or suspension which is then added to the latex emulsion and the phenylbetanaphthylamine is maintained in the dispersed phase without settling during completion of the process for the production of rubbery materials.

Polymers have been made by the emulsion process by polymerizing butadiene-1,3 with styrene or acrylonitrile. Instead of butadiene-1,3 other diolefins such as isoprene, piperylene, dimethyl butadiene and the like may be used. Instead of styrene and acrylonitrile other vinyl compounds such as vinyl methyl ketone and the like may be used. The reactants are emulsified in water in a reactor in the presence of an emulsifying agent, a catalyst and a polymerization modifier. The reaction zone is maintained under a pressure of about 0 to 100 pounds per square inch to maintain the reactants in liquid form.

The mixture is rapidly stirred from the beginning of the operation to emulsify the liquids before the reaction is started. After the reaction has started and has gone on for the desired time the latex is freed of volatile unreacted material by reducing the pressure and flashing off unreacted monomers by steam, stabilized by the addition of phenylbetanaphthylamine and then coagulated with a concentrated salt solution or in combination with an acid. Our invention is concerned with the preparation of the dispersion containing phenylbetanaphthylamine and the addition of this dispersion to the emulsion or latex.

The following example sets forth one process of carrying out an emulsion process for polymerizing butadiene-1,3 and acrylonitrile.

A mixture containing about 200 parts by weight of water, 75 parts by weight of butadiene, 26 parts by weight of acrylonitrile, 5 parts by weight of sodium oleate, 0.5 part by weight $C_{12}$ mercaptan and 3 parts by weight of potassium persulfate is emulsified by agitating the mixture in a pressure vessel maintained at about 50 pounds per square inch gauge for about 20 hours. The mixture is agitated to form an emulsion before the polymerization starts and is continued throughout the reaction to maintain the emulsion in turbulent condition. The temperature is controlled by removing heat from the cooling jacket surrounding the reaction vessel. As the polymerization is exothermic it is necessary to remove heat during the reaction and this is usually done by having a jacket around the reaction vessel. Other means of removing heat from the reaction vessel may be used.

A latex is obtained by carrying out the above process and this latex is the polymer formed by the copolymerization of butadiene and acrylonitrile. The pressure on the latex in the pressure vessel is then reduced to about atmospheric pressure to flash off volatile unreacted material. During this flashing off process most of the butadiene will be removed and may be recovered for the use in succeeding polymerizations.

The phenylbetanaphthylamine dispersion is preferably added to the emulsion after the flashing step but may be added before the flashing step. The latex is then stripped with steam in a separate stripping vessel to remove acrylonitrile which is preferably recovered and used as part of the acrylonitrile feed in succeeding operations.

Heretofore difficulty has been encountered when phenylbetanaphthylamine is added to the latex or emulsion because of settling of the phenylbetanaphthylamine from the emulsion. The phenylbetanaphthylamine is added to prevent oxidation of the rubbery material which is recovered from the process and prevents oxidation of the rubbery material during storage.

According to our invention the phenylbetanaphthylamine is dispersed in an aqueous liquid containing alcohol, bentonite clay and gum arabic. The preferred form of the invention contains the following ingredients in the proportions named:

25.0 parts by weight phenylbetanaphthylamine
0.2 parts by weight bentonite clay
0.5 parts by weight gum arabic
5.0 parts by weight 90 volume percent isopropyl alcohol
69.3 parts by weight water The above mixture was ball milled for about 24 hours and was found to give a dispersion meeting all the requirements of a satisfactory phenylbetanaphthylamine dispersion. The phenylbetanaphthylamine dispersion was added to the latex or emulsion in an amount equivalent to about 2% by weight of the solids in the emulsion after the flashing step. There was no settling of the phenylbetanaphthylamine dispersion during the stripping operation and the phenylbetanaphthylamine was taken up by the rubberlike particles and retained by them during and following the coagulation step. Before coagulation the emulsion containing the dispersion was stable and no settling of the added dispersion was noted during a period of several days.

Following the addition of the phenylbetanaphthylamine dispersion, the resulting latex or emulsion is then passed into a coagulating zone where the emulsion is violently agitated with a saturated sodium chloride solution which coagulates the small emulsion particles into larger particles. In some cases where the amount of soap emulsifier is high in the latex, it is desirable to add an acid such as acetic acid or $CO_2$ to form larger particles on coagulation. About 50 to 200% by weight on the emulsion of the saturated sodium chloride solution is used. The coagulate is then washed with warm water, separated from the water and then dried with hot air at a temperature of about 225° F. in a drying zone. The rubbery particles are then further processed as desired to put them into desired form such as sheets or are used as such to make desired rubbery products.

In the above example it is to be understood that the amount of reactants may be varied and that other similar reactants may be used. The sodium oleate or other emulsifier may vary between 1 and 5 parts. The $C_{12}$ mercaptan or other modifier may vary between about 0.5 to 5% by weight. The potassium persulfate or other catalyst may vary between about 0.5 and 3 parts by weight.

Instead of using sodium oleate other soaps such as sodium stearate or soaps formed by reacting fats with alkalies may be used and other emulsifiers may be used such as salts of alkylated naphthalene sulfonic acids and the like. The mercaptans are used as modifiers or chain terminators and other modifiers may be used such as dialkyl xanthogen disulfide or the like. Instead of the potassium persulfate catalyst other copolymerization catalysts such as hydrogen peroxide, alkali metal or ammonium persulfate or perborate and the like may be used.

While we have given a specific formula for the phenylbetanaphthylamine dispersion or suspension, it is to be understood that the proportions given may be varied. The phenylbetanaphthylamine may vary from about 15 parts by weight to 35 parts by weight, the betonite clay may vary from about 0.1 part by weight to 0.5 part by weight, the gum arabic may vary between 0.2 part by weight and 1.0 part by weight, the isopropyl alcohol may vary between about 12 parts by weight and 15 parts by weight and water may vary between about 48.5 parts by weight and 82.7 parts by weight. Instead of gum arabic other emulsifying agents such as casein, alginates etc., may be used. Instead of isopropyl alcohol other alcohols such as tertiary-butyl and ethyl alcohol may be used. While we have given a specific time for ball milling the phenylbetanaphthylamine suspension it will be apparent that some variation in this time of milling may be used without deviating from the invention. For example, the phenylbetanaphthylamine mixture may be ball milled or otherwise dispersed for a period of time varying between about 12 hours and 40 hours. Also, the dispersion may be effected by means other than a ball mill as for example a colloid mill. By using other equipment it may be possible to cut down substantially on the amount of time necessary to form the phenylbetanaphthylamine dispersion.

In the specific example above given, the amount of the phenylbetanaphthylamine dispersion is about 2% by weight on the solids in the latex or emulsion but this amount may be varied between about 1.5 and 3.0 by weight on the solids in the emulsion.

In the above example for forming the rubbery emulsion the pressure in the reaction vessel may vary between about 40 and 50 pounds per square inch gauge and the time of reaction may vary between 9 hours and 20 hours. Also, the temperature during the reaction may vary between about 45 and 90° F.

Instead of phenylbetanaphthylamine, we may use one or more of the stabilizing agents set forth in our application Serial No. 657,144, filed March 26, 1946. Also, di-betanaphthyl-p-phenylene diamine may be used as a stabilizing agent.

While our preferred form of the invention comprises the use of bentonite clay or other colloidal clays and gum arabic, in some instances it is possible to omit the gum arabic and to use only the bentonite clay. However, the omission of the gum arabic results in a phenylbetanaphthylamine dispersion which is not as good as the preferred form of the invention and we prefer to use both the colloidal clay and the gum arabic to produce a more stable dispersion.

Also, a dispersion of phenylbetanaphthylamine may be made in a water solution of gum arabic. While this dispersion is better than one prepared using bentonite clay alone, it is not as good as the preferred form of our invention using a mixture of bentonite clay and gum arabic which produces a more stable dispersion with less of the dispersing agent. In this way the cost of the dispersion is reduced.

During the production of our dispersion there is no foaming such as is encountered when using soap and similar emulsifying or dispersing agents.

While we have given a specific example for carrying out our invention it is to be expressly understood that this example is by way of illustration only and modifications and changes may be made without departing from the spirit of our invention.

What we claim is:

1. In an aqueous emulsion polymerization process for the production of rubbery material wherein butadiene-1,3 is copolymerized with acrylonitrile to form a latex and volatile material is flashed from the reaction mixture following the polymerization step, the improvement which comprises adding to the latex following the flashing step but prior to the stripping and coagulating steps a dispersion of phenylbetanaphthylamine formed by ball milling the following mixture:

25.0 parts by weight phenylbetanaphthylamine
0.2 part by weight bentonite clay
0.5 part by weight gum arabic
5.0 parts by weight 90 volume per cent isopropyl alcohol
69.3 parts by weight water 2. A method for introducing a stabilizer into an aqueous emulsion or rubbery polymer formed by the copolymerization of butadiene-1,3 and acrylonitrile and maintaining the stabilizer dispersed in the emulsion during processing thereof, which comprises adding a dispersion composed of 15 to 35 parts by weight of phenyl-betanaphylamine, 0.1 to 0.5 part by weight of bentonite clay, 0.2 to 1.0 part by weight of gum arabic, 12 to 15 parts by weight of isopropyl alcohol in water to the emulsion after the formation of the latex but before final processing of the latex to form coagulated solid particles of rubbery material.

3. In an aqueous emulsion polymerization process for the production of rubbery material wherein a conjugated diolefin of 4 to 6 carbon atoms and a compound selected from the group consisting of acrylonitrile, styrene and vinyl methyl ketone are copolymerized and the emulsion is then flashed to remove unreacted material, the improvement which comprises adding to the emulsion following the flashing step an aqueous suspension of 15 to 35 parts by weight of phenyl beta naphthylamine containing 12 to 15 parts by weight of an alkanol of 2 to 4 carbon atoms, 0.1 to 0.5 part by weight of bentonite clay and 0.2 to 1.0 part by weight of gum arabic which has been ball milled in 48.5 to 82.7 parts by weight of water to form a stable dispersion.

4. A stable dispersion comprising 48.5 to 82.7 parts by weight of water, 12 to 15 parts by weight of an aliphatic alkanol of 2 to 4 carbon atoms, 15 to 35 parts by weight of a naphthylamine stabilizing agent selected from the group consisting of phenyl beta naphthylamine and dibetanaphthyl p-phenylene diamine, 0.1 to 0.5 part by weight of colloidal clay and 0.2 to 1.0 part by weight of gum arabic.

5. In an aqueous emulsion polymerization process for the production of rubbery materials wherein a conjugated diolefin of 4 to 6 carbon atoms is copolymerized with a compound selected from the group consisting of acrylonitrile, styrene and vinyl methyl ketone, the improvement which comprises adding to the polymerized emulsion a stable aqueous suspension containing 15 to 35 parts by weight of a stabilizing agent selected from the group consisting of phenyl beta naphthylamine and dibetanaphthyl p-phenylene diamine, 12 to 15 parts by weight of an alkanol of 2 to 4 carbon atoms, 01. to 0.5 part by weight of a colloidal clay and 0.2 to 1.0 part by weight of an emulsifying agent selected from the group consisting of gum arabic and casein.

ALBERT P. GIRAITIS.
KENNETH J. WHITTET.

REFERENCES CITED

The following references are of record in the file of this patent:

UNITED STATES PATENTS

| Number | Name | Date |
|---|---|---|
| 1,428,084 | Gravell | Sept. 5, 1922 |
| 2,256,853 | Schwartz | Sept. 23, 1941 |
| 2,333,023 | Manor | Oct. 26, 1943 |
| 2,378,882 | Habib | June 19, 1945 |
| 2,390,765 | York | Dec. 11, 1945 |
| 2,441,523 | Ward | May 11, 1948 |